No. 638,278. Patented Dec. 5, 1899.
I. L. ROBERTS.
ELECTRODE AND PROCESS OF MAKING SAME.
(Application filed Nov. 17, 1894. Renewed Dec. 31, 1898.)

(No Model.)

WITNESSES:
INVENTOR,
Isaiah L. Roberts,
BY Pierson L. Wells
HIS ATTORNEY.

UNITED STATES PATENT OFFICE.

ISAIAH L. ROBERTS, OF NEW YORK, N. Y.

ELECTRODE AND PROCESS OF MAKING SAME.

SPECIFICATION forming part of Letters Patent No. 638,278, dated December 5, 1899.

Application filed November 17, 1894. Renewed December 31, 1898. Serial No. 700,856. (No specimens.)

*To all whom it may concern:*

Be it known that I, ISAIAH L. ROBERTS, a citizen of the United States, residing in the city of New York, (Brooklyn,) county of Kings, State of New York, have invented a new and useful Improvement in Anodes or other Electrodes for Use in Electrolysis and Process of Making Same, the following description thereof being so full and clear that one skilled in the art to which it appertains can make the same.

Heretofore anodes have been made of carbon particles bound together by a carbonizable binding material which was subsequently carbonized, or they have been held together by resin, with which they were heated and cooled under pressure, and they have also been held in form or shape by a bag or wall. I have discovered a more efficient method of binding the particles of carbon together which makes a more durable anode.

The accompanying drawings represent an apparatus for carrying out my invention, in which—

Figure 1:
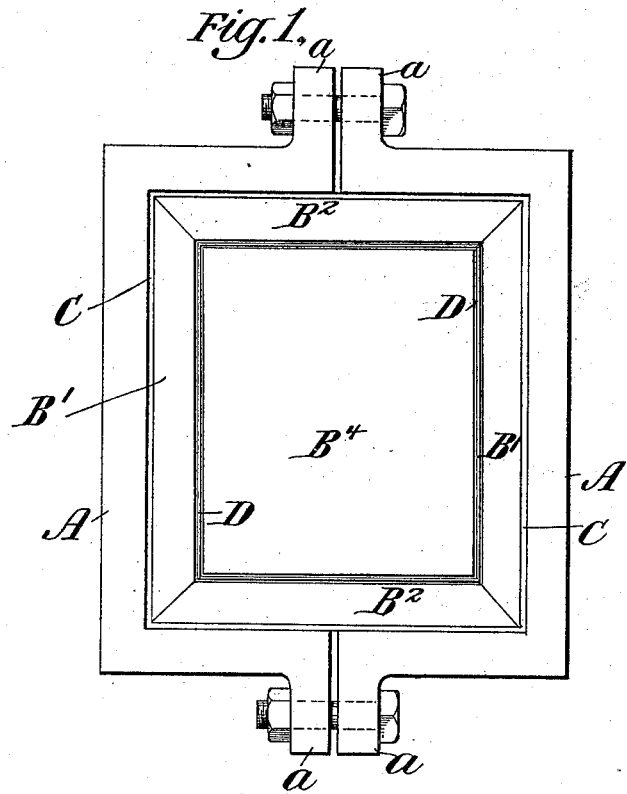
Figure 2:
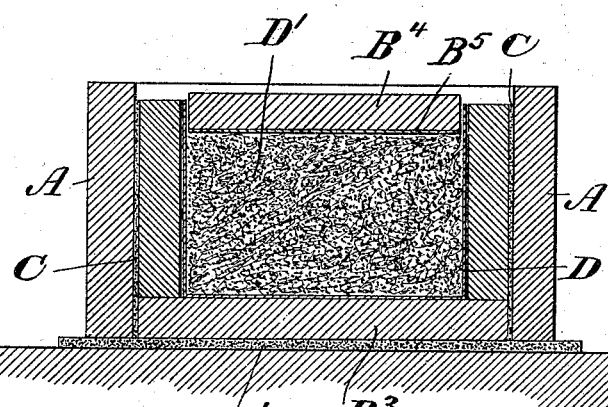

Figure 1 is a plan view of the apparatus, and Fig. 2 a cross-sectional view thereof.

Similar letters of reference designate corresponding parts in both figures.

In carrying out my method I make an intimate mixture of carbon particles and glass particles. The size of the carbon particles I prefer to be those which will go through screens between twenty and one hundred mesh, although ordinary pulverized carbon may be used. I prefer not to use any particles which will pass through a one-hundred-mesh sieve. I prefer the glass to be pulverized as fine as possible. I mix the screened carbon with the glass dust in such proportions that when the glass is fused and pressed it will fill or partially fill the interstices in the carbon. Having made the mixture, (indicated in the drawings by the letter D',) I place the whole in a thin sheet-iron pan D of the dimensions which it is desired to make the anode. The sheet-iron should be quite thin, say No. 26, and be liquid-tight in the bottom. I now place the pan and its contents in a furnace, preferably an electric furnace, and heat it and its contents until the whole is hot enough to make the glass quite liquid. I then place it in an iron box or mold made of five parts, the ends of the box or mold being represented by the letters $B^2$ $B^2$ and the sides by the letters $B'$ $B'$. The fifth part is a loose bottom $B^3$. I place on top of the carbon and glass a thin sheet of iron $B^5$ of the same thickness as the pan. This mold is heated red-hot before the red-hot pan and contents are set in it. I have also a red-hot plunger $B^4$, which fits loosely in the box. This I place on the cover $B^5$ of the pan. I then place the mold in a second iron mold, which is cold and here shown to be constructed in sections provided with lugs $a$, through which pass fastening-bolts, then place the whole on the base-plate $C'$ of a hydraulic press, and press down the plunger with a pressure sufficient to force the particles of granulated carbon against each other, squeezing the molten glass into the interstices between the carbon particles, and if there is an excess of it forcing it out of the mold around the plunger. I prefer not to use any more than enough glass to bind the carbon particles together. I retain the pressure on the mold until the glass has solidified, and then I remove the hot mold from the cold one and open it and remove the sheet-iron pan D, which contains the anode. I next remove the sheet-iron from the contained anode by either peeling it off by force after cutting its edges with a cold-chisel, or by placing it in a bath of acid, which will dissolve it off, and thus leave a clean plate of carbon and glass which is a good conductor of electricity. The surface is somewhat improved for contact with liquids if it is removed, which may be done by an emery-wheel or other hard abrader, or by heating it in a hot solution of caustic soda.

To make the anode, any kind of carbon may be used; but I prefer anthracite coal which has been previously highly heated in a retort. However, the anthracite may be carbonized sufficiently if heated hot enough with the glass, thus making one heating do for both carbonizing and pressing.

The object of using the outer cold mold is to strengthen the inner hot one, and the use of the sheet-iron is to prevent the molten glass from coming in contact with the hot mold and sticking to it. The object of the hot mold is to keep the glass from being chilled on the surface before it can be pressed.

Having fully described my glass-bound anode and the process of manufacturing the same, what I claim, and desire to secure by Letters Patent, is—

1. The process of making an electrode, which consists in heating a mixture of pulverized glass and carbon, and then subjecting the mixture to pressure while the glass is in a soft or plastic condition, thereby causing the adherence of the glass particles, substantially as specified.

2. The process of making an electrode, which consists in heating a mixture of pulverized glass and anthracite coal, and then subjecting the mixture to pressure while the glass is in a soft or plastic condition, thereby causing the adherence of the glass particles, substantially as specified.

3. An electrode composed of a compressed mixture of pulverized glass and carbon, the particles of glass being adherent to each other and acting as a binder, substantially as specified.

4. An electrode composed of a compressed mixture of pulverized glass and coked anthracite coal, the particles of glass being adherent to each other and acting as a binder, substantially as specified.

ISAIAH L. ROBERTS.

Witnesses:
   EDW. B. DICKINSON,
   L. SHERMAN.